Figure 1:
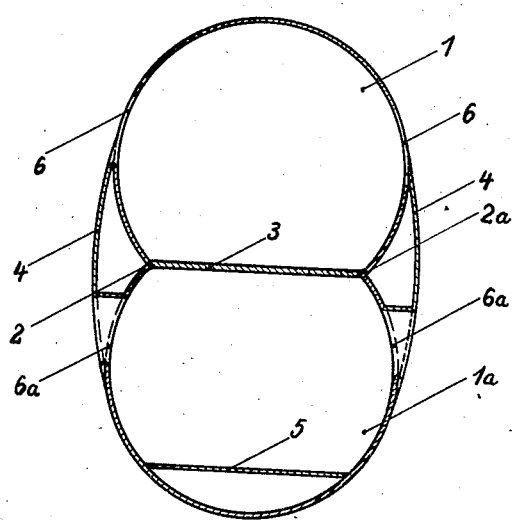

March 25, 1941.   E. ZINDEL   2,236,482
AIRPLANE CABIN
Filed Sept. 8, 1939

Inventor:
Ernst Zindel
By Gerald F. Baldwin
His Attorney.

Patented Mar. 25, 1941

2,236,482

UNITED STATES PATENT OFFICE 2,236,482

AIRPLANE CABIN

Ernst Zindel, Dessau, Germany, assignor to Junkers Flugzeug-und-Motorenwerke Aktiengesellschaft, Dessau, Germany, a corporation of Germany Application September 8, 1939, Serial No. 293,989
In Germany September 24, 1938

2 Claims. (Cl. 244—119)

This invention relates to improvements in airplane cabins, and refers particularly to cabins for larger airplanes, intended to fly at high altitudes.

In the past it has been customary to make such air plane cabins substantially circular in cross section, and to divide them into separate portions or decks by walls extending transversely through the center of the cabins which also serve as reinforcements for the outer walls or shells. Such an arrangement is however open to the objection that a cabin of circular cross section is highly unsatisfactory from an aerodynamic standpoint because it offers such considerable head resistance; again with a dividing wall so positioned full utilization cannot be made of the space within the divided cabin portions, or decks; and again the window arrangement is such that only very inadequate vision can be obtained from one of the decks.

This invention aims, among other things, to provide an airplane cabin, consisting of a plurality of decks, wherein these drawbacks are overcome, and consists of two curved shells or outer wall portions, each of which extend through more than a semi-circle in cross section, connected to one another along their longitudinal margins and having a dividing wall extending transversely of the cabin between the opposite pairs of connected shell margins. By this construction I provide a cabin wherein the outer walls may be safely made of quite thin material to produce a cabin of very light weight; moreover I also provide a cabin wherein the divisions or decks can both be fully utilized across substantially their entire width, wherein ample headroom is provided, and wherein the windows may be so arranged that an ample range of vision is afforded from both decks. Again a cabin so formed is aerodynamically very efficient when forming a part of a fuselage, and a floor may be provided transversely of the lower curved portion of the shell to form the floor of the lower deck and this floor may be of substantially the same width as the dividing wall which also constitutes the floor of the upper deck.

Another object of the invention is to provide an airplane cabin of the aforementioned across section wherein sheeting extends along each side thereof between the lines of greatest width along the two shell portions to enclose a space between the outer sides of the latter and the said sheeting through which control rods and the like may extend.

A further object of the invention is to provide such an airplane cabin wherein the upper side or flange of the wing spar may extend through the cabin and form at least a part of the dividing wall which constitutes the flooring of the upper deck, thereby eliminating the necessity for steps over such a part if arranged above the level of said flooring and the consequent reduction of headroom in the upper deck that the provision of such steps would necessitate. The lower side or flange of the wing spar is centrally divided and its inner extremities are anchored by braces extending diagonally to the upper side of the spar and to the lower flooring respectively, thereby utilizing the cabin structure to reinforce other portions of the airplane.

Figure 2:
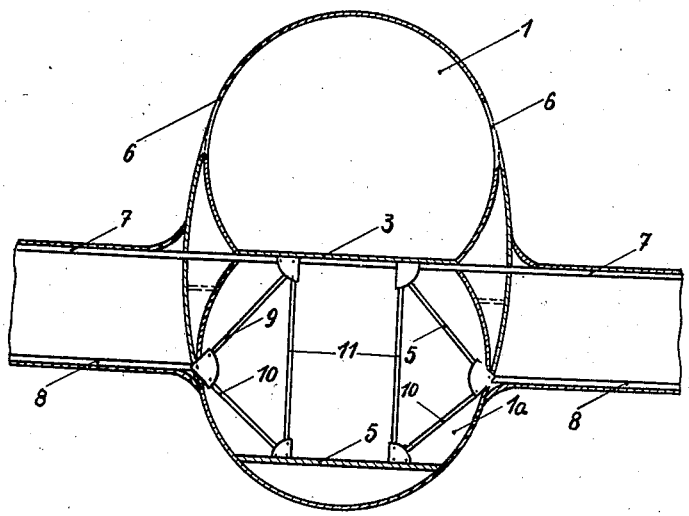

Having thus stated some of the objects and advantages of the invention, I will now proceed to describe an embodiment thereof with the aid of the accompanying drawing, in which:

Figure 1 illustrates a transverse section through a double-deck cabin towards one extremity thereof, and Figure 2 shows a similar cross section through the central portion of the cabin and the wing spars and bracing for the flanges thereof.

Referring to the drawing, the cabin consists of an upper and a lower shell portion I and Ia each of which, in section, extends through more than a semi-circle. These two shell portions are connected to one another along their horizontally opposed margins 2 and 2a, and extending transversely between the joints thus formed is a wall 3 which constitutes at least a part of the flooring of the upper deck defined within the upper shell portion I. A wall 5, preferably of similar width to the wall 3, is also provided across the lower shell portion Ia to form a floor for the lower deck confined within the said lower shell portion. The longitudinal margins of the sheeting member 4 are secured along each side of the cabin and substantially along the lines of greatest width of the upper and lower shell portions I and Ia, thereby enclosing the unaerodynamic portions of the shell adjacent the joints formed along their margins 2 and 2a. 6 designates windows provided in the upper shell portion I, and 6a denotes horizontally aligned windows provided in the lower shell portion Ia and in the sheeting member 4.

As will be seen from Figure 2, the upper flange 7 of the wing spars may be continuous and extend transversely through the cabin parallel and contiguous to the wall 3, in the present instance beneath the latter, to form a portion of the flooring of the upper deck enclosed within the upper shell portion I. The lower flanges 8 of the wing spars preferably terminate adjacent opposite sides of the lower shell portion 1a, and, in the present instance, just within the latter. Diagonal braces 9 and 10 are secured to the inner extremities of the flanges 8. The braces 9 extend and are attached to the flooring formed by the central portion of the upper flange 7 and the wall 3, and the lower braces 10 extend and are secured to the wall 5 which constitutes the floor of the lower deck confined within the lower shell portion 1a. Reinforcing members 11 may also be provided within the lower deck parallel to one another both to reinforce the upper and lower floors 3 and 5, and also to retain the extremities of the braces 9 and 10 also secured thereto in spaced relation. Moreover between the opposed pairs of reinforcing members 11 a passageway may be formed connecting the front and rear of the lower deck.

It is understood that while in the foregoing a double-decked arrangement has been shown and described, the cabin shell may be of such size that a greater number of decks may be provided if desired; and again while one method of connecting the wings to the cabin has been described and shown it is understood that other means may be substituted therefor; and also that the wings, and the spars therefor, may also be arranged at other heights relative to the cabin.

What I claim is:

1. An airplane cabin comprising transversely curved upper and lower shell portions, transversely opposed joints formed along contacting longitudinal margins of the two shell portions, and a flange of a wing spar extending transversely through said cabin and said joints forming at least a portion of a flooring for an upper deck confined within the upper shell portion, said flange being secured to both said shell portions.

2. An airplane cabin comprising transversely curved upper and lower shell portions, transversely opposed joints formed along contacting longitudinal margins of the two shell portions, a wing spar having its upper flange extending transversely through said cabin and said joints forming at least a portion of a flooring for an upper deck confined within the upper shell portion, a transverse wall in the lower shell portion forming a floor therein, and braces extending from said flooring and said floor connected to spaced opposed extremities of the lower flange of said wing spar.

ERNST ZINDEL.